US008473845B2

(12) United States Patent
Igelman et al.

(10) Patent No.: US 8,473,845 B2
(45) Date of Patent: Jun. 25, 2013

(54) VIDEO MANAGER AND ORGANIZER

(75) Inventors: Marvin Igelman, Thornhill (CA); Aleksandar Zivkovic, North York (CA)

(73) Assignee: Reazer Investments L.L.C., Dover, DE (US)

( * ) Notice: Subject to any disclaimer, the term of this patent is extended or adjusted under 35 U.S.C. 154(b) by 1119 days.

(21) Appl. No.: 11/810,807

(22) Filed: Jun. 6, 2007

(65) Prior Publication Data

US 2008/0172615 A1    Jul. 17, 2008

Related U.S. Application Data

(60) Provisional application No. 60/880,246, filed on Jan. 12, 2007, provisional application No. 60/881,134, filed on Jan. 18, 2007.

(51) Int. Cl.
*H04N 9/12* (2006.01)
*G06F 17/30* (2006.01)
*G06F 7/76* (2006.01)

(52) U.S. Cl.
USPC ........... 715/719; 715/722; 715/708; 707/709; 707/738; 707/739

(58) Field of Classification Search
USPC ........................ 715/719; 707/738, 739, 709
See application file for complete search history.

(56) References Cited

U.S. PATENT DOCUMENTS

| | | | |
|---|---|---|---|
| 8,024,329 B1 * | 9/2011 | Rennison | 707/723 |
| 8,103,679 B1 * | 1/2012 | Cranfill et al. | 707/750 |
| 8,112,324 B2 * | 2/2012 | Frank et al. | 705/27.1 |
| 2004/0220905 A1 * | 11/2004 | Chen et al. | 707/3 |
| 2006/0047649 A1 * | 3/2006 | Liang | 707/4 |
| 2006/0106793 A1 * | 5/2006 | Liang | 707/5 |
| 2006/0129917 A1 * | 6/2006 | Volk et al. | 715/513 |
| 2006/0277210 A1 * | 12/2006 | Starbuck | 707/102 |
| 2006/0282304 A1 * | 12/2006 | Bedard et al. | 705/10 |
| 2007/0106657 A1 * | 5/2007 | Brzeski et al. | 707/5 |
| 2007/0130112 A1 * | 6/2007 | Lin | 707/2 |
| 2007/0203942 A1 * | 8/2007 | Hua et al. | 707/104.1 |
| 2007/0208679 A1 * | 9/2007 | Tseng et al. | 706/45 |
| 2007/0214488 A1 * | 9/2007 | Nguyen et al. | 725/134 |
| 2007/0226077 A1 * | 9/2007 | Frank et al. | 705/27 |
| 2007/0244902 A1 * | 10/2007 | Seide et al. | 707/10 |
| 2008/0021924 A1 * | 1/2008 | Hall et al. | 707/103 X |
| 2008/0033932 A1 * | 2/2008 | DeLong et al. | 707/5 |
| 2008/0086688 A1 * | 4/2008 | Chandratillake et al. | 715/719 |
| 2008/0114644 A1 * | 5/2008 | Frank et al. | 705/14 |

* cited by examiner

*Primary Examiner* — Daeho Song
(74) *Attorney, Agent, or Firm* — Woodcock Washburn LLP (57) ABSTRACT

An online video search system, including a tag discoverer including a web encyclopedia crawler for (i) accessing a web encyclopedia to find web pages related to at least one designated reference topic, and (ii) retrieving a plurality of web pages by performing an n-level depth recursive traversal of the web pages found, and web pages that are hyper-linked thereto, a concept extractor for extracting important concepts founds in the retrieved plurality of web pages, and a user interface for providing at least of the important concepts extracted by the web page processor to an online video search engine. A method and a computer-readable storage medium are also described and claimed.

32 Claims, 5 Drawing Sheets

VIDEO MANAGER AND ORGANIZER

CROSS REFERENCES TO RELATED APPLICATIONS

This application claims priority from U.S. Provisional Application No. 60/880,246, filed on Jan. 12, 2007, entitled VIDEO MANAGER AND ORGANIZER, and from U.S. Provisional Application No. 60/881,134, filed on Jan. 18, 2007, also entitled VIDEO MANAGER AND ORGANIZER.

FIELD OF THE INVENTION

The present invention relates to video management, organization and playback.

BACKGROUND OF THE INVENTION

Television entertainment is based on pre-selected channel content interspersed with advertisements. A user can switch between channels, but once within a channel, the user cannot change what is being continually broadcast. This is also true of online TV channels.

In distinction, the Internet is provides complete freedom for a user to select content he wishes to see. For example, a user may perform a content search on the Internet, and then select which results he wishes to view.

In would thus be of advantage to have an entertainment system that combines the convenience of watching continuous play of a selected channel, together with the freedom of selecting desired channel content.

SUMMARY OF THE DESCRIPTION

The present invention concerns a video manager and organizer that enables users to generate custom channels, where a channel includes a user-generated plurality of online videos arranged in a playback sequence. The present invention enables continuous playback of the channel, whereby the videos are played back-to-back in a continuous stream, similar to the way a television plays a broadcast channel. As such, the present invention combines the benefits of an enormous inventory of online videos with the convenience of a TV.

In order to combine Internet technology with TV technology, the present invention overcomes several challenges. One such challenge is the ability to automatically remove duplicate videos from a plurality of videos. Duplicate videos are videos that have substantially similar content. It will be appreciated by those skilled in the art that duplicate videos may not be recognizable via metadata such as title, description and runtime, since these often vary from one copy of a video to another.

Another such challenge is the ability to automatically determine when a video has finished playing, in order to know when to start playing the next video in sequence.

The custom channels generated by the present invention may be dynamic channels that are automatically updated when additional video content is found. Such a custom channel may be, for example, the result of an online video search. As new videos are posted on video source websites such as YouTube™, Google® Video, MySpace® and Metacafe™, the search results may include more videos. The present invention automatically adds such videos to the custom channel as they are discovered. Another such custom channel may be, for example, videos posted by a designated user. As the designated user posts additional videos, they are automatically added to the custom channel.

Custom channels generated by the present invention may also be static channels, with pre-selected videos.

There is thus provided in accordance with an embodiment of the present invention a method for video entertainment, including receiving references defining a custom sequence of online videos, and playing the custom sequence in continuous play, including automatically determining when a video currently being played is finished playing, including monitoring a play button being displayed for a change of status from pause to play, and playing a next video in the custom sequence when the automatically determining determines that the current video has finished playing.

There is additionally provided in accordance with an embodiment of the present invention a video entertainment system, including a channel definition database for providing a custom sequence of references to online videos corresponding to a channel, a graphic display analyzer for monitoring a play button being displayed for a change of status from pause to play, to automatically determine when a video currently being played is finished playing, and a channel player for playing the online videos in continuous play, including a video player for playing a next video in the custom sequence when the graphic display analyzer determines that the current video has finished playing.

There is moreover provided in accordance with an embodiment of the present invention a method for searching for online videos, including providing at least one reference topic, accessing a web encyclopedia to find web pages related to the at least one reference topic, performing an n-level depth recursive traversal of the web pages found by said accessing, and web pages that are hyper-linked thereto, to retrieve a plurality of web pages, extracting important concepts found in the retrieved plurality of web pages, and performing an online video search using at least one of the important concepts identified by the extracting.

There is further provided in accordance with an embodiment of the present invention an online video search system, including a tag discoverer including a web encyclopedia crawler for (i) accessing a web encyclopedia to find web pages related to at least one designated reference topic, and (ii) retrieving a plurality of web pages by performing an n-level depth recursive traversal of the web pages found, and web pages that are hyper-linked thereto, a concept extractor for extracting important concepts founds in the retrieved plurality of web pages, and a user interface for providing at least of the important concepts extracted by the web page processor to an online video search engine.

There is yet further provided in accordance with an embodiment of the present invention a method for video management, including receiving references defining a plurality of online videos, and automatically removing references to videos from the plurality of videos that are substantially similar in content to other videos from the plurality of videos, including monitoring interactive user inputs to determine which videos are skipped by a user after a short playback period of time.

There is additionally provided in accordance with an embodiment of the present invention a video management system, including a channel definition database for providing references to a sequence of online videos corresponding to a channel, a user behavior analyzer for determining which videos are skipped by a user after a short playback period of time, and a duplicate remover for removing references to videos in the plurality of videos whose content is substantially similar to content of other videos in the plurality of videos based on results obtained from the user behavior analyzer.

There is moreover provided in accordance with an embodiment of the present invention a computer-readable storage medium storing program code for causing a computing device to receive references defining a custom sequence of online videos, to automatically determine when a video currently being played is finished playing, by monitoring a play button being displayed for a change of status from pause to play, and to play a next video in the custom sequence when the computing device determines that the current video has finished playing.

There is further provided in accordance with an embodiment of the present invention a computer-readable storage medium storing program code for causing a computing device to provide at least one reference topic, to access a web encyclopedia to find web pages related to the at least one reference topic, to perform an n-level depth recursive traversal of the web pages found by the accessing, and web pages that are hyper-linked thereto, to retrieve a plurality of web pages, to extract important concepts found in the retrieved plurality of web pages, and to perform an online video search using at least one of the important concepts identified by the extracting.

There is yet further provided in accordance with an embodiment of the present invention a computer-readable storage medium storing program code for causing a computing device to receive references defining a plurality of online videos, and to automatically remove references to videos from the plurality of videos that are substantially similar in content to other videos from the plurality of videos, by monitoring interactive user inputs to determine which videos are skipped by a user after a short playback period of time.

BRIEF DESCRIPTION OF THE DRAWINGS

The present invention will be more fully understood and appreciated from the following detailed description, taken in conjunction with the drawings in which.

DETAILED DESCRIPTION

The present invention relates to a form of video entertainment that combines the paradigm of the Internet with the paradigm of a television. Using the present invention, a user may generate his own custom sequence of videos and organize them into channels. Each channel can be continuously played, similar to the way broadcast channels are played on a TV.

Figure 1:
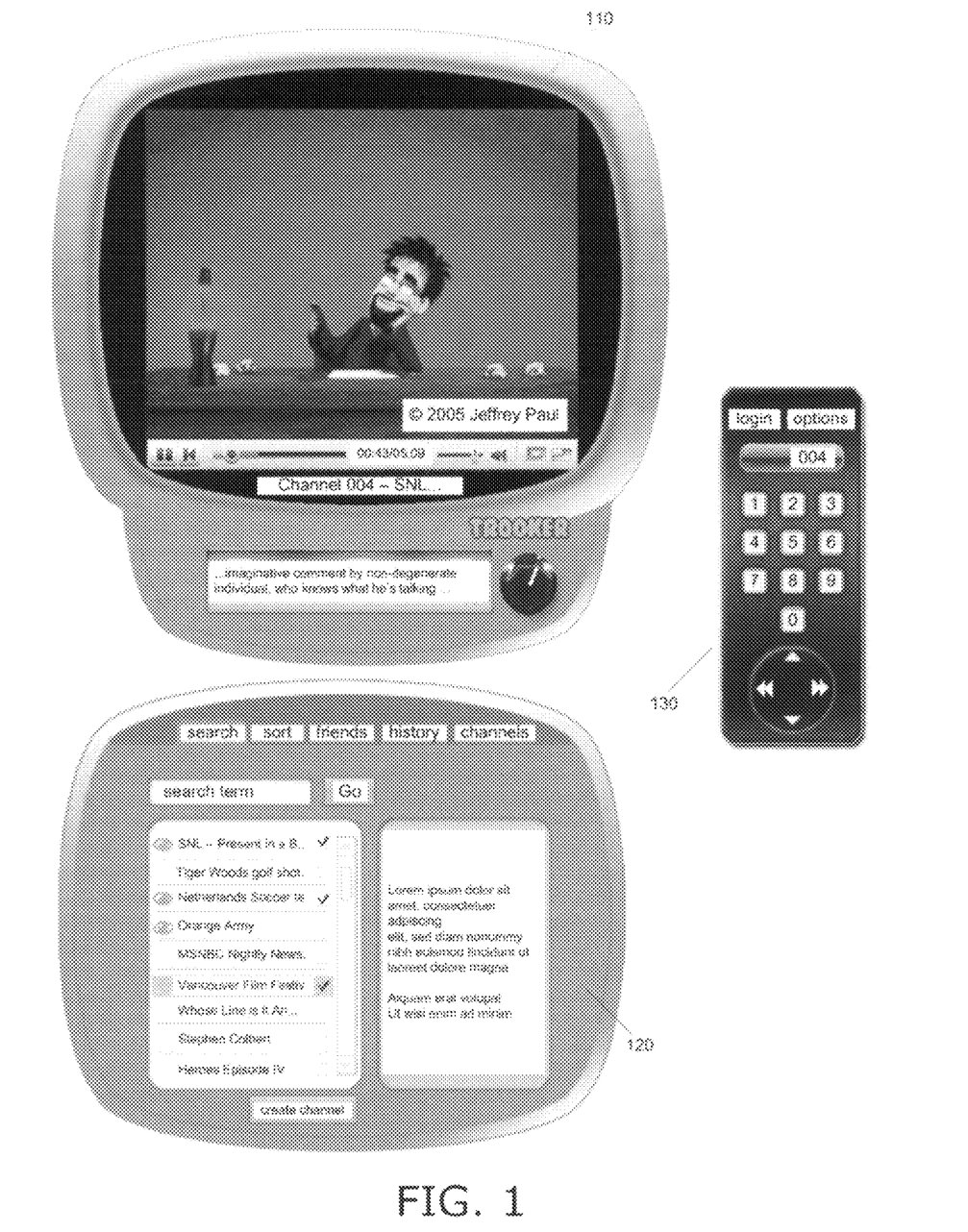
FIG. 1 is an illustration of a user interface for watching on-line video content, in accordance with an embodiment of the present invention.

Reference is now made to FIG. 1, which is an illustration of a user interface for watching on-line video content, in accordance with an embodiment of the present invention. The user interface of FIG. 1 includes three panels; namely, a viewer 110 that appears as a TV screen within which a video is played; a channel guide 120 within which a sequence of videos is listed; and a remote control device 130 with buttons for interactively playing any or all of the videos listed in channel guide 120. The channel guide 120 includes a list portion 123, and a video information portion 127 that displays summary information about a video being watched. Additionally, the user interface may include a fourth panel; namely, a chat window (not shown) as described hereinbelow.

Remote control device 130 enables a user to switch between channels, view any or all of the videos in a channel, play/pause/stop a video being played. In distinction from conventional TVs, however, channel directory 120 enables a user to generate custom channels of videos.

Panels of the user interface of FIG. 1 may be implemented as a plurality of windows that may stick to each other when docked. The viewer window may be the primary window, and other windows dock and attach thereto when they are brought within a designated proximity thereof. The user may select which user interface panels are visible; for example, viewer only, viewer+remote, viewed+guide+remote+video information.

The three parts 110, 120 and 130 of the user interface are described in detail with reference to FIG. 2 hereinbelow.

The user interface of FIG. 1 operates somewhat like a TV and somewhat like an Internet browser. Like a TV, the user interface continuously streams content to the user. Like an Internet browser, the user can perform a search for videos and choose which videos to watch from the result set. The results are presented as a stream of sequential videos, in a hands-off default play mode; but the user can skip videos and change the play sequence in a hands-on remote control mode.

As such, the user interface of the present invention overcomes drawbacks of TVs and drawbacks of Internet browsers. When watching TV broadcast from television stations or when watching conventional on-line TV channels, the user cannot change what is being broadcast at a given time. The only freedom the user has is to switch between channels. In distinction, Internet browsers provide the user with the freedom of choosing content that the user wishes to see. For example, a user can search for content of interest, and then decide what to watch from the result set presented. However, the Internet search results are not presented in a hands-off fashion, as a stream of sequential videos.

The present invention leverages both of these paradigms. A user can search for content using an Internet search engine, and choose watch selected search results as a TV channel with a continuous video stream.

The present invention may be implemented on a wide variety of entertainment devices, including a media PC and a game console. Using the present invention, the entertainment device behaves like a TV, and yet brings content of interest to the user and not only vice versa.

Figure 2:
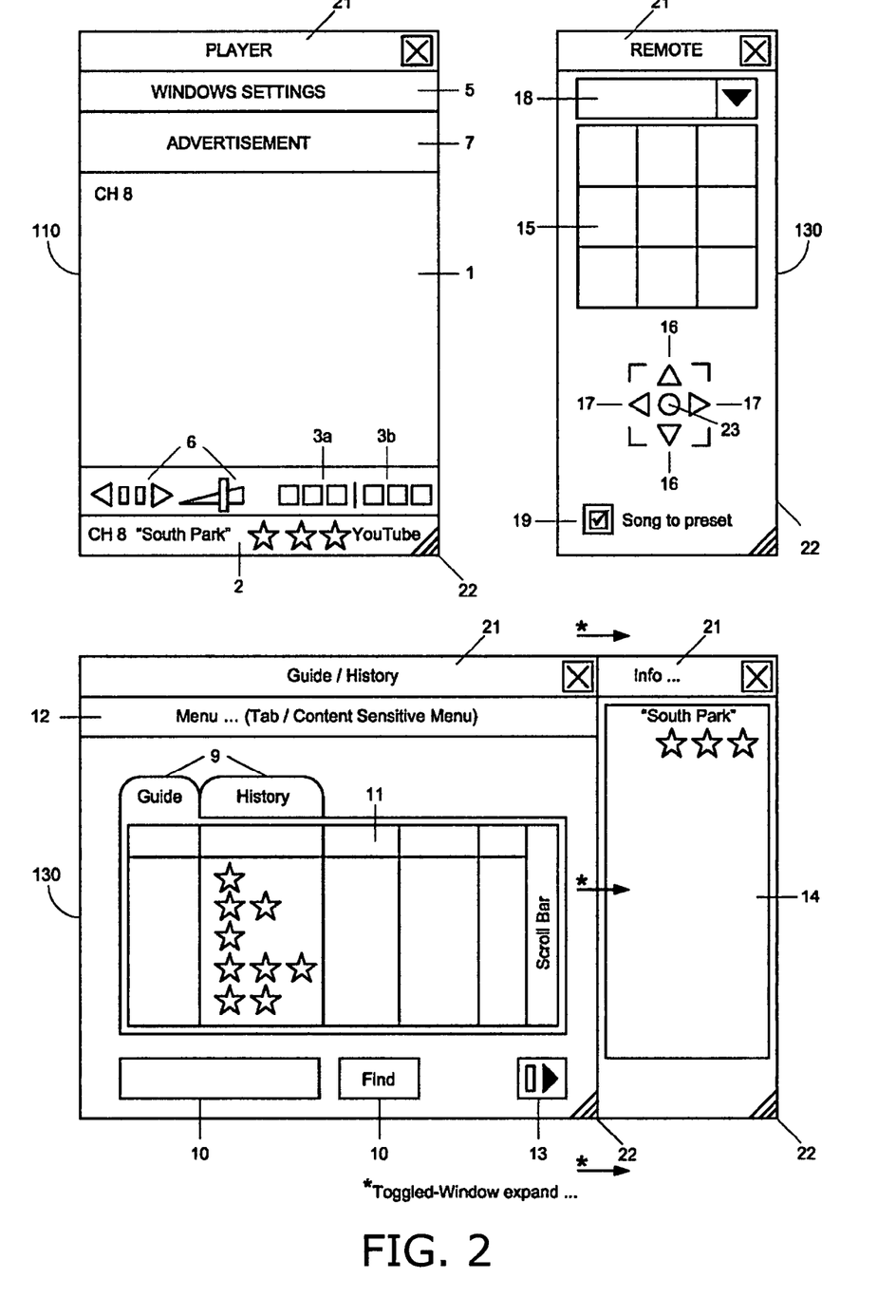
FIG. 2 is an illustration of user interface components within the user interface of FIG. 1, in accordance with an embodiment of the present invention.

Reference is now made to FIG. 2, which is an illustration of user interface components within the user interface of FIG. 1, in accordance with an embodiment of the present invention. As shown in FIG. 2, the present invention may be implemented using familiar TV-type paradigms, including inter alia a TV viewer, a heads up display, remote control with numeric channels, and an online video guide.

FIG. 2 includes many user interface components labeled by numerals according to TABLES I-III below. Common to all windows in FIG. 2 are a title bar/close button 21, and a resize "grip" 22.

In accordance with an embodiment of the present invention, the user interface of FIG. 2 is skin-able, thereby allowing a user to produce his own version of a user interface skin, which determines the look of the user interface. Such a skin generally consists of an XML file that identifies active elements of the interface, such as buttons, and image files for images within the interface.

TABLE I

TV Screen User Interface

| | | |
|---|---|---|
| Embedded player (e.g., YouTube ™) | 1 | |
| Status bar | 2 | Video # of # |
| | | Query string, station name and/or channel # |
| | | Rating (stars, icon) |
| | | Source |
| | | Channel # |
| Toggles (icons) | | Group A 3a | Remote |
| | | | Guide |
| | | | Chat |
| | | Group B 3b | Full screen |
| | | | Minimize |
| | | | Always on top |
| HUD/Overlay | 4 | Channel # |
| | | Volume |
| | | Video name |
| Menu | 5 | Settings | Login |
| | | | Account Settings |
| | | Windows | Remote |
| | | | Guide |
| | | | Chat |
| | | | Full screen |
| | | | Minimize |
| Controls | 6 | Previous |
| | | Next |
| | | Play/Pause |
| | | Mute |
| | | Master volume |
| | | (popup slider) |
| Ad space | 7 | |

TABLE II

Channel Guide User Interface

| | | |
|---|---|---|
| Listing Table | 8 | |
| Tab (toggles guide/history view) | 9 | |
| Query field and button | 10 | |
| Sortable column headers | 11 | |
| File menu - context sensitive to current tab | 12 | |
| Information pane toggle (icon) | 13 | |
| Information pane | 14 | Title |
| | | Source (logo) |
| | | Length |
| | | Description |
| | | Rating (stars icon) |

TABLE III

Remote Control User Interface

| | |
|---|---|
| Number pad | 15 |
| Channel up/Channel down | 16 |
| Previous/Next | 17 |
| Preset dropdown | 18 |
| Save (icon) current query based channel | 19 |
| HUD/Overlay toggle ("Display" on Sony) | 23 |

Several functionalities achieved by the present invention are described hereinbelow; specifically, (i) search functionality with tag discovery, (ii) share functionality, (iii) rating functionality, (iv) "Ask an Expert" functionality, (v) duplicate removal functionality, and (vi) continuous streaming functionality.

Search Functionality with Tag Discovery

In accordance with an embodiment of the present invention, the search functionality invoked by control 10 of the user interface of FIG. 2 is configurable to search across various online video sources, including inter alia YouTube™, Google® Video, MySpace® and Metacafe™. For some video sources, search results are obtained by calling application programming interfaces (API's) provided by their search engines; and for other video sources that do not provide web API's, search results are obtained by parsing HTML that is presented on web pages. Search results from different video sources are converted to the same format, thereby allowing consistent sorting of the result sets.

The user can sort search results based on various fields, including inter alia (i) has the video been viewed previously, (ii) video rating, (iii) date/time posted, (iv) runtime, and (v) number of views.

Search results can be used to create channels. More generally, a user can create his own channel from any of (a) a search string, (b) videos posted by a specific user, and (c) a custom list of videos that the user has prepared. Regarding (a), a search string may include both inclusion and exclusion criteria. For example, the user can search for "giant dogs" and exclude results that contain "skateboard." Such exclusion may be necessary since the common term "dog" has a connotation of dog the animal, and an unrelated connotation of skateboard moves. The search string may specify criteria for fields used in the result set, including inter alia fields (i)-(v) listed hereinabove.

Regarding (b) above, channels created by a specific user are generally ethnic/culture based channels. Active users often post many videos that are specific to a culture. Both (a) and (b) are dynamic channels that are automatically updated whenever new videos are found that satisfy criteria (a) or (b).

Regarding (c) above, a custom list may include a set of videos and other interstitials such as users' photos, music and personal videos, collected by a user and labeled as a channel. In distinction to (a) and (b), criteria (c) creates a static channel, which does not automatically update itself. If the user desires to update his custom list, he does so manually.

The user can publish his channel, and embed his channel by placing the channel in blogs and personal pages such as pages on MySpace® and FaceBook. Embedded channels are Flash objects or iframes that are served from a web server and receive channel definitions from the web server. The embedded channels are read-only in the pages where they are published and, as such, only the creator of a channel can edit his channel.

For dynamic channels, which are automatically updated when new videos are found that satisfy criteria (a) or (b), the user may receive automatic notifications when the channels receive new videos. This feature is particularly advantageous for new channels, whereby the user receives alerts when there is breaking news, and the user does not have to wait to advance to the section of the news that interests him. For example, the user can skip the business section of news and proceed directly to the sports section.

In one embodiment, the present invention uses an agent running as a background task that looks for new videos that satisfy a channel's criteria at regular time intervals, such as every 30 minutes. When such new videos are found, the user is alerted. The user may also review a channel log, where references to new videos are logged, to see what videos the user has missed.

The present invention enables a user to view only previously unviewed videos. This feature is particularly advantageous in situations where the user performs a search, or creates a channel based on search criteria, and returns later to see updated results for the search. The present invention maintains a viewing history of which videos the user has previously seen, and enables the user to see only those videos that he has not seen previously. Such unseen videos include new videos, and old videos that the user has not yet watched. A user may clear the viewing history, or ignore the viewed status.

Alternatively, a user may view previously unviewed videos by sorting the search results based on a "previously viewed" field, and viewing the results starting with the first video that he has not seen previously.

The search functionality of the present invention also includes a tag discovery technology. Conventional video content providers provide search capabilities based on the concept of tags. A "tag" is a simple term, like a keyword, that describes the content of a video. Tags are generally not derived from video content or from a description of the video; instead, they are generally created by the user himself when he publishes his video. As such, tags are semantic attributes of video, which simplify the search process.

Viewers searching for online videos often do not know the exact tag names they need in order to retrieve videos of interest. For example, a user may be interested in music of a particular country. Some online music videos may be tagged with the name of the country they come from, but other may be tagged instead with the name of the artist. The publisher of the video, of course, does not know the context from which a searcher may come; such as a cultural context in this example. Thus a user searching, say, for Israeli music, will not find music videos that only have the name of the artist as their tag.

In one embodiment, the present invention provide tag discovery via encyclopedias such as the encyclopedia of Wikipedia.org. Wikipedia is a user generated online encyclopedia that is maintained up to date by topic experts. The information in Wikipedia is presented using hyperlinked text, whereby important concepts and references are hyperlinked to other page in Wikipedia or on the Internet.

Figure 3:
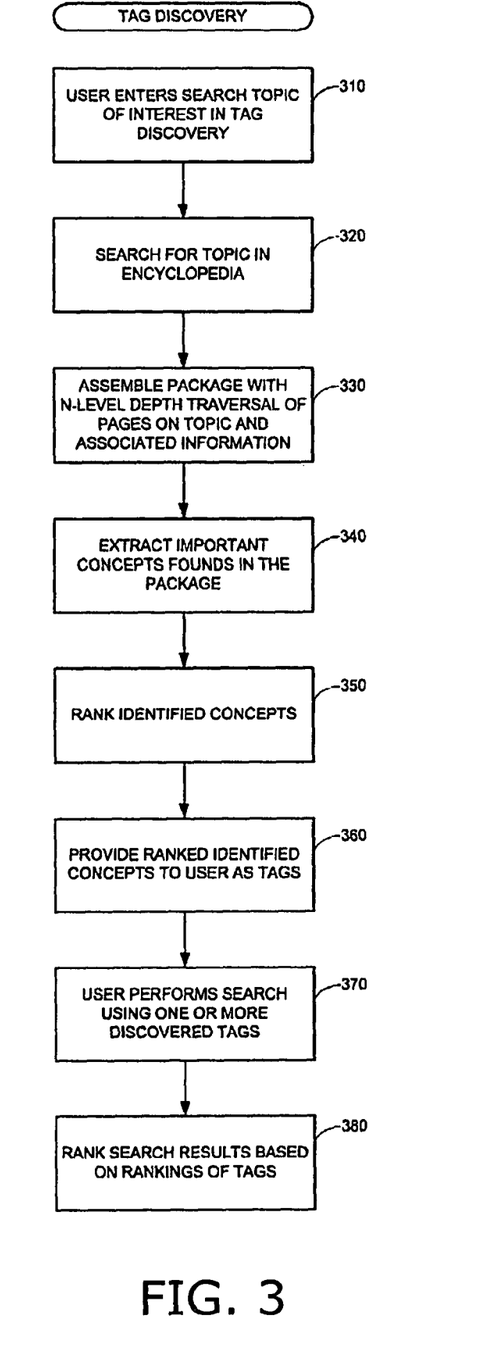
FIG. 3 is a simplified flowchart of a method for tag discovery, in accordance with an embodiment of the present invention.

Reference is now made to FIG. 3, which is a simplified flowchart of a method for tag discovery, in accordance with an embodiment of the present invention. At step 310, a user enters one or more search topics of interest, for tag discovery. At step 310 the one or more search topics are used as terms for searching one or more encyclopedias, such as Wikipedia. Generally, the pages returned by the encyclopedia search engine include links to articles on the topics of interest.

At step 330 the various links are followed recursively to a designated depth, n, and the pages and information discovered are arranged in a package. At step 340 the package is processed to extract important concepts contained therein. Typically, automated identification of important concepts is performed (i) using statistical methods, including inter alia identifying re-occurring terms and filtering out noise words; and (ii) by identifying special types of concepts including inter alia dates and proper nouns such as names of people, places and companies.

At step 350 the important concepts extracted at step 340 are ranked. Generally, ranking is based on one or more criteria including inter alia one or more of the following:
    reference counts;
    number of hits in video sources;
    position of the concept within the page;
    whether the concept is a proper noun;
    whether the concept is hyperlinked; and
    rankings provided by other databases.
At step 360 the identified and ranked concepts are provided to the user as tags. The tags presented to the user are the discovered tags; i.e., output of the requested tag discovery. At step 370 the user performs a search using some or all of the discovered tags.

At step 380 the results of the search are ranked, based on the rankings of the concepts assigned at step 350. In one embodiment of the present invention, search results are ranked according to the sum of the ranks of the concepts that appear in the meta-data of the results. Thus, if a video in the search results includes concepts #1, #2 and #3 in its meta-data, then the video is ranked according to the sum of the rankings of concept #1, concept #2 and concept #3.

As an example of the tag discovery method of FIG. 3, suppose a user is search for videos relating to Italian art. At step 310, the user enters the keywords "Italian art". At step 320, an encyclopedia such as Wikipedia is consulted for Italian art, and at step 330 the encyclopedia references, and the web pages that are hyperlinked thereto, up to a depth of n, are collected into a package. At step 340 the important concepts are extracted and at step 350 they are ranked. The following TABLE IV lists the extracted concepts and their rankings, for Italian art.

TABLE IV

Tag discovery for "Italian art"

| Tag | Rank | Tag | Rank |
|---|---|---|---|
| Italian art | 5.328 | Rosso Fiorentino | 3.387 |
| Rome | 2.997 | EI Greco | 3.385 |
| Michelangelo | 2.995 | Titian | 2.882 |
| Italy | 2.992 | Tintoretto | 2.879 |
| Ancient Rome | 3.490 | Caravaggio | 2.877 |
| Gothic | 2.987 | Agostino Carracci | 3.318 |
| Medieval | 2.985 | Christian | 2.869 |
| Italian Renaissance | 3.482 | France | 2.864 |
| Mannerism | 2.979 | Giovanni Battista Tiepolo | 2.862 |
| Baroque | 2.977 | Impressionism | 2.859 |
| Rococo | 2.974 | Macchiaioli | 2.856 |
| Futurism | 2.972 | Modigliani | 2.854 |
| Renaissance | 2.969 | Expressionist | 2.851 |
| Dominican | 2.967 | Amedeo Modigliani | 3.349 |
| Franciscan | 2.964 | Cubism | 2.844 |
| Dominic | 2.962 | Filippo Tommaso Marinetti | 2.841 |
| Roman Catholic | 3.459 | Gino Severini | 3.338 |
| Inquisition | 2.956 | Dadaists | 2.836 |
| Europe | 2.954 | Metaphysical | 2.833 |
| World Heritage Site | 2.951 | Surrealists | 2.831 |
| Cimabue | 2.949 | Arturo Martini | 4.328 |
| Raphael | 2.946 | Giacomo Manzu | 3.326 |
| Ancient Greek | 3.441 | Antonio Donghi | 3.323 |
| Roman | 2.938 | Corrado Cagli | 3.321 |
| Medicis | 2.936 | Gianfilippo Usellini | 3.318 |
| Michelangelo Buonarroti | 3.433 | Pietro Annigoni | 3.315 |
| Donatello | 2.931 | Guillaume Apollinaire | 3.313 |
| Raffaelllo | 2.928 | Luigi Pirandello | 3.310 |
| Sistine Chapel | 3.423 | Michaelangelo Antonioni | 3.318 |
| Pietá | 2.921 | Post-Modernism | 2.805 |
| Mona Lisa | 3.418 | Kitsch | 2.803 |
| The Last Supper | 2.915 | Metanarratives | 2.800 |
| Madonnas | 2.913 | Gianfranco Ferroni | 3.297 |
| David | 2.905 | Carlo Maria Mariani | 2.795 |
| Pontormo | 2.903 | Venice Art Biennal | 2.792 |
| Mannerist | 2.900 | Italian plasma artist | 2.787 |
| Giulio Romano | 3.397 | Italian | 1.000 |
| Expressionism | 2.895 | Art | 1.000 |

At step 360 the discovered tags of TABLE IV are returned to the user, and at step 370 the user performs a search using one or more of the discovered tags. At step 380 the results of the search are ranked, based on the rankings of TABLE IV. Suppose that the following video is included in the search results.

```
<source>YouTube</source>
    <id>rVQBVE9BzYk</id>
    <title>Italian Renaissance Art</title>
    <description>Four major artists, plus their major art
    work</description>
    <author>raluca04</author>
    <length_seconds>532</length_seconds>
    <view_count>833</view_count>
    <tags>michelangelo Leonardo DaVinci Raffaello Donatello</tags>
    <url>http://www.youtube.com/?v=rVQBVE9BzYk</url>
```

It is noted that the tags of the video, "Michelangelo Leonardo DaVinci Raffaello Donatello" match the following TABLE IV tags:

Michelangelo (rank=2.995)
Michelangelo Buonarroti (rank=3.433)
Michaelangelo Antonioni (rank=3.318)
Rafaello (rank=2.928)
Donatello (rank=2.931)

The sum of their ranks is 15.605, which is the rank assigned to the above search result; namely, the YouTube video entitled "Italian Renaissance Art".

It will be appreciated by those skilled in the art that the tag discovery method of FIG. 3 enables users with minimal topic understanding to perform efficient searches for videos that are relevant to their interests.

It will further be appreciated by those skilled in the art that the tag discovery method of FIG. 3 is not specific to video searches, and applies to any type of topical search including inter alia Internet searches. Once the discovered tags are identified, they may be used for searching any information source that has search capability. More generally, the tag discovery method of the present invention can be described as performing a natural language analysis of one or more reference topics, to discover a list of important concepts; and then using the generated list as a context for performing searches via search engines. For example, for finding medical information relating to one or more reference topics, the list of important concepts may be discovered from the reference topics by consulting a medical encyclopedia (steps 320-360), and then a search, say in Google, may be performed based on the discovered concepts (step 370).

Figure 4:
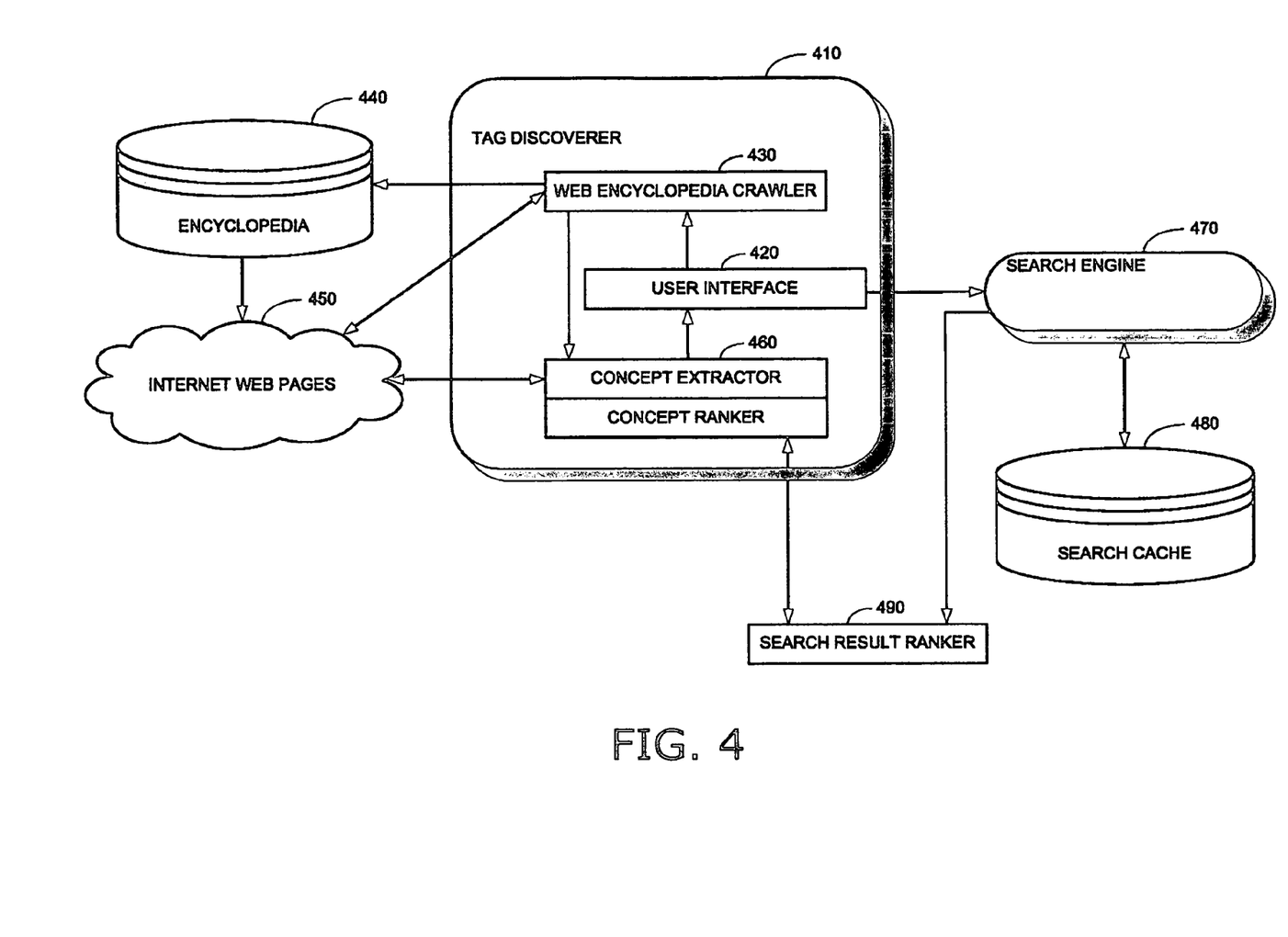
FIG. 4 is a simplified block diagram of a tag discovery system, in accordance with an embodiment of the present invention.

Reference is now made to FIG. 4, which is a simplified block diagram of a tag discovery system, in accordance with an embodiment of the present invention. Shown in FIG. 4 is a tag discoverer 410, for assisting a user in obtaining relevant search results. Tag discoverer 420 includes a user interface 420, through which a user enters one or more reference topics of interest. The reference topics are passed to a web encyclopedia crawler 430, which searches for the reference topics in an encyclopedia 440. In general, topic descriptions in encyclopedia 440 include hyper-links to related web pages from the Internet 450. Web encyclopedia crawler 430 accesses these related web pages and recursively accesses web pages from the Internet 450 related to the related web pages, up to a depth, n, of traversal. A package listing the resulting web pages accessed by web encyclopedia crawler 430, is passed to a concept extractor and ranker 460.

Concept extractor and ranker 460 parses the web pages listed in the package, to extract important concepts found therein and to rank the extracted concepts. As described hereinabove, concept extractor and ranker 460 may use statistical analysis to find most frequently recurring words, excluding noise words; and concept extractor may use text analysis to extract proper nouns.

The important concepts extracted by concept extractor 460 are passed to the user via user interface 420. In turn, the user selects one or more of these concepts are tags for input to a search engine 470.

Search engine 470 may query one or more online video repositories. Search engine 470 may also or alternatively query a search cache 480.

Search result ranker 490 ranks the results obtained from search engine 470, based on the concept rankings assigned by concept extractor and ranker 460, as described hereinabove.

Share Functionality

The present invention includes an embedded instant messenger platform, through which users can instantly notify their friends when they discover videos of interest. When a user uses the present invention and is logged in, he may access other logged in users through a "friends" interface. The embedded instant messenger uses messaging extensions over a conventional messaging protocol such as Jabber, to implement the following features.

Notifying a friend of interesting videos;
Bi-directional exchange of video references;
With the friend's permission, send the friend one or more videos; and
Group viewing of videos, playlists and channels; for example, a user invites his friends to a presentation of his new channel, and in turn the friends watch the same videos and comment upon them as they watch them.

It will thus be appreciated by those skilled in the art that the present invention provides added benefits over conventional instant messaging whereby it provides seamless embedding of links to videos; and when a receiver receives the embedded links he can open the video links immediately, or add them to the end of a current list, or send a reply message. Users can thus exchange play lists or even exchange complete channels. Such messaging activity results in quick and lively discussions along with exchange of videos.

Rating Functionality

Using the present invention, a server computer can collect anonymous user behavior information including inter alia video view counts, video viewing time and video searches, and generate ratings and other statistics from this information. Such statistics are generally of interest to entertainment and other industries that try to stay in tune with popular interests.

"Ask an Expert" Functionality

Conventional online video ratings are based on popularity. Often obscure videos float up to the top of a list of videos, not because of a quality rating but because of the nature of the viewing public. When a user wants to see top quality videos on a serious topic, such as an historical event, conventional rating processes are not efficient are often necessitate that the user searches through videos for long periods of time until he finds the ones he is interested in.

In accordance with an embodiment of the present invention, a user can activate an "Ask an Expert" control to initiate a conversation with topical experts. For example, a user interested in hockey videos clicks on the "Ask an Expert" control and may ask about interesting hockey videos, some of which may be difficult to find. One or more experts receive the request and reply with links to interesting videos of recent hockey events, and may also discuss the videos with the user.

The user may also comment on and rate the quality of the videos provided by the experts, and post their comments and ratings. Publicity and monetary incentives may be provided to encourage knowledgeable people to act as experts. In addition to ranking of videos, the present invention also includes ranking of experts.

Duplicate Removal Functionality

The present invention removes duplicate results from video searches. It will be appreciated by those skilled in the art that result sets coming from searches may often include multiple URLs for the same content. This is true of almost any search engine. For example, often the same press report is posted on many different web sites, and a search for a specific topic of one such press report generally produces many copies of that press report, coming from different URLs.

In the framework of the present invention, a video search often results in multiple results which are the same, or essentially the same video, each such result coming from a different video source. When the video results are continuously played on a channel, it would be frustrating to a viewer to have the same video reoccur.

The task of identifying duplicate videos in search results is particularly challenging, since the same video may reoccur with different title, description and tags. Duplicate videos may not have the exact same time duration, and the qualities of the duplicate videos may be different. As such, time length or file size of videos are insufficient for determining if two videos are duplicates of one another.

Conventional technologies for identifying duplicate files are not able to resolve duplicate videos. Frame analysis generally fails because of varying video quality. When users upload their videos to web sites, typically a high definition source video, in formats such as AVI or MPG, are transcoded into lower resolutions and smaller dimensions for formats such as Flash Video (FLV). In addition, videos posted on one web site are often posted on other web sites by downloading from the first web site and uploading to another web site; e.g., download from YouTube™ and upload to Metacafe™. Different video web sites generally use different encoding parameters, and moreover videos that are re-posted on other web sites are generally multiply encoded, with each successive encoding resulting in a loss of quality. Frame analysis also fails because of time shifting of scenes. One copy of a video may be started a few seconds earlier that another copy of the same video. A more complex scenario is when a user posts a video is a subset of another video.

In accordance with an embodiment of the present invention, removal of duplicate videos is achieved by monitoring user behavior.

When a user is presented with a set of videos that result from a search, the videos are generally presented in an order that reflect the relevancy of the videos to the user's search, based on a weighting used by a search engine. The present invention presents the video results to the user in a continuous sequential stream. If a video is not of interest to the user, he generally skips it. If the user receives two similar videos, typical user behavior is to watch the first video that occurs in the play sequence, and skip the second video when he realizes that it is a duplicate of the first video.

The user's skipping the second video can be identified by the short time that the user spends viewing the second video. Typically, the short time is on the order of a few seconds, which is sufficient time for a human to recognize that the video is a repeat of one that he saw beforehand. As such, a combination of factors including inter alia similarity of video title, description, tags and length, in conjunction with user behavior, is sufficient to determine that the second video is a duplicate.

The algorithm used to identify duplicate videos in this embodiment of the present invention is a type of learning algorithm. The first user that plays the videos from a search result does no have the benefit of a prior user's behavior information. Assuming a large user based, this is a tolerable limitation.

For user interfaces where the video search results are presented as thumbnail representations, user behavior information is used in conjunction with a prevalence of clicks on one video thumbnail over another video thumbnail with similar characteristics.

It will be appreciated by those skilled in the art that other rationales may apply to a user skipping over a video, such as bad quality of the video, instead of duplication. Nevertheless, removing skipped over videos is advantageous in filtering out undesirable videos.

Continuous Streaming Functionality

As described hereinabove, the present invention provides continuous streaming of a channel of videos; i.e., the sequence of videos in the channel are played back-to-back one after the other, similar to the way a TV plays a broadcast channel. Continuous play of video is an intriguing challenge, in that it is not clear how to automatically determine when a current video finishes playing, so as to start the next video in sequence. I.e., how can it be automatically determined when a video is finished playing?

Generally, the present invention is not able to access video in its source Flash Video format (FLV), since on-line video sources intentionally prevent access to the source. These on-line video sources disseminate videos through embeddable tags that contain Shockwave Flash (SWF) code, which controls the underling FLV source. Shockwave Flash is the movie player for Flash videos. However, SWF code does not raise events that can identify when a video is finished playing.

Further complicating the problem of determining when a video is finished playing is the fact that, depending on the Internet connection, there may be pauses in playback when a video stream is not able to be downloaded ahead of viewing. As such, actual run-time of a video does not always match the view time of the video.

In an embodiment of the present invention, finishing of video playback is derived by monitoring the status of the SWF player's buttons. In this regard, it is noted that the SWF player is not a Windows application. It is an embedded OCX control. Thus the buttons that are displayed are not Windows controls, and one cannot use the Windows UI framework application programming interface (API) functions to send and receives messages to and from the buttons.

Instead, the present invention performs graphical analysis of hot regions of the SWF player to determine when a change of status has occurred in playback of a video. The play button changes to a pause button while the video is playing, and changes back to a play button when the video is finished. Thus the present invention automates what a human sees as he watches the video controls; namely, that the play button has changed status.

Figure 5:
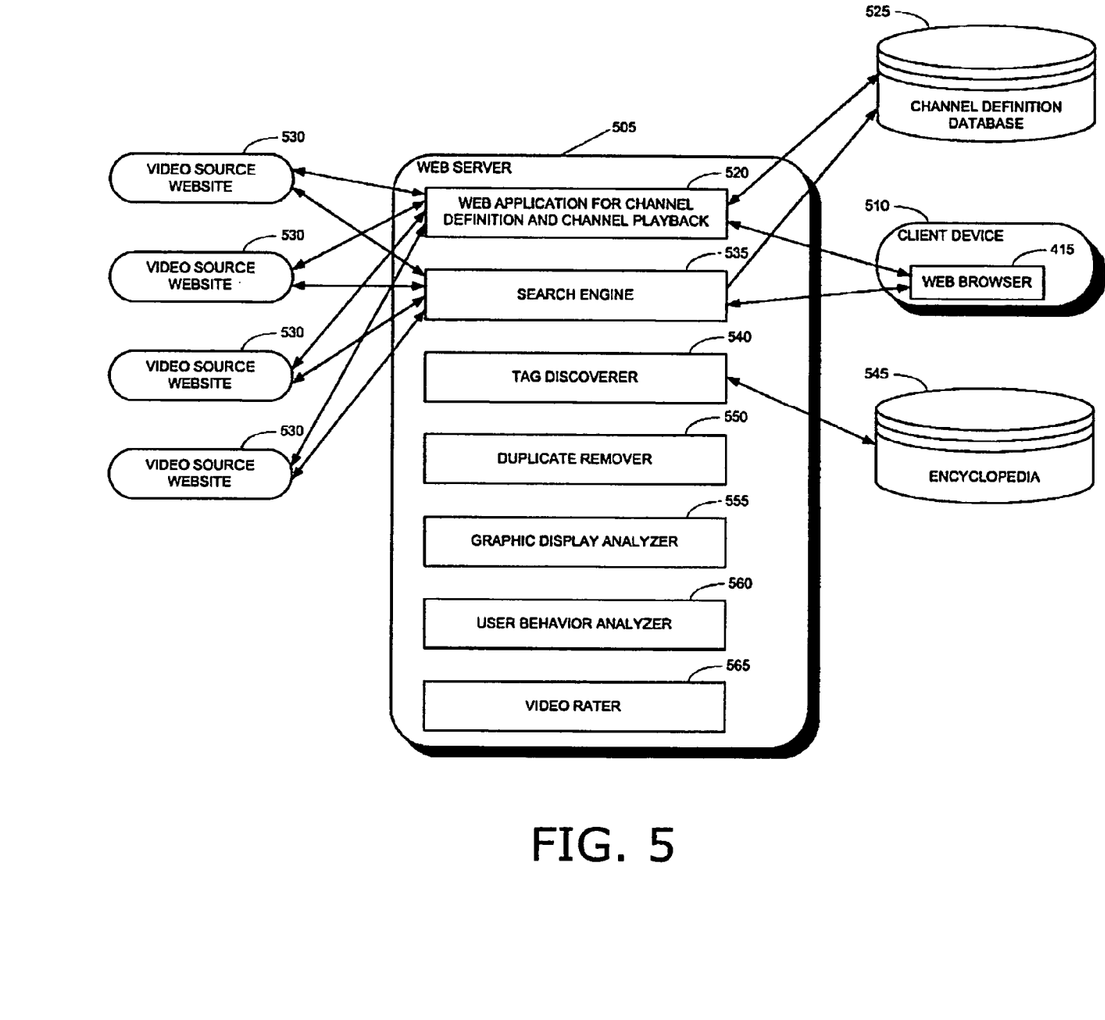
FIG. 5 is a simplified block diagram of a video entertainment system, in accordance with an embodiment of the present invention.

Reference is now made to FIG. 5, which is a simplified block diagram of a video entertainment system, in accordance with an embodiment of the present invention. Shown in FIG. 5 is a web server 505, which interacts with client device 510. Web server 505 may be any computer or plurality of computers that include web server software necessary to serve web pages and web objects to client device 510. Client device 510 may be any electronic device that includes a web browser 515 for retrieving and rendering web pages. Client device 510 may be inter alia a conventional desktop or laptop computer, an entertainment device such as a television or media center, or a portable device such as a PDA or cell phone or video player.

Web server 505 includes a web application 520 for defining channels and continuously playing channels, in accordance with the present invention. Users and their channel definitions are stored in a channel definition database 525. Web application 520 accesses a plurality of online videos from video source websites 530, such as YouTube™, Google® Video, MySpace® and Metacafe™.

Web server 505 also includes a search tool 535, for constructing search queries and generating corresponding search result sets. Search tool 535 conducts searches over video source websites 525, and combines search results therefrom to generate a combined search result set. In turn, the combined search result set is used to define a channel.

Web server 505 also includes a tag discoverer 540, for providing the tag discovery functionality described hereinabove, which enhances the capability of search tool 535 to find videos of relevance. Tag discoverer 540 generates one or more concepts associated with one or more reference topics by consulting a web encyclopedia 545.

Web server 505 also include a duplicate removal tool 550, for removing those videos from search result sets that are substantially similar to content to other videos from the same search result set. Removal of duplicate videos is described hereinabove.

Web server 505 also includes a graphic analyzer 555 for analyzing a graphic display to determine when the status of a control for a video player has changed status. Graphic analyzer 555 is used to determine when a video has finished playing, and the next video in the channel sequence should start playing.

Web server 505 also includes a user behavior analyzer 560 for analyzing interactive user behavior during playback of videos. User behavior analyzer 560 is used to remove duplicate videos from a result set of videos for a channel, so that playback of the channel does not play the same video content more than once in the channel sequence. Use of behavior analyzer 560 for removal of duplicate videos is described hereinabove.

Web server 505 also includes a video rater 565, for assigning ratings to online videos. Video rater 565 may assign a rating to an online video based on the number of times the online video is played, or based on the lengths of time the online video is played. The latter criterion takes in consideration videos that are skipped by users after a few seconds of playback.

It will be appreciated by those skilled in the art that the system illustrated in FIG. 5 is but one of many architectures for embodying the present invention. In a different architecture, for example, client device 510 may includes a client application (not shown) for interacting with web server 505 and for playing videos from desired channels. Websites 530 may also include other types of content, in addition or instead of video content, including inter alia, images, slideshows, presentations and music.

In reading the above description, persons skilled in the art will realize that there are many apparent variations that can be applied to the methods and systems described.

In the foregoing specification, the invention has been described and illustrated with reference to specific exemplary embodiments thereof. It will, however, be evident that the specific exemplary embodiments are not intended to be limiting, and various modifications and changes may be made to these embodiments without departing from the broader spirit and scope of the invention as set forth in the appended claims. Accordingly, the specification and drawings are to be regarded in an illustrative rather than a restrictive sense.

What is claimed is:

1. A method, comprising:
    receiving search results from a search of a database, the search results comprising a plurality of concepts and a concept rank associated with each of the plurality of concepts;
    identifying a plurality of videos, each of the plurality of videos having associated therewith at least one video tag;
    determining, for each of the plurality of videos, a subset of the plurality of concepts, wherein each of the plurality of concepts in the subset corresponds with one of the at least one video tag;
    determining, for each of the plurality of videos, a video rank based on the concept rank for each of the plurality of concepts in the subset; and
    providing a link to each of the plurality of videos and an indication of a rank of the plurality of videos, wherein the rank of the plurality of videos is based on the video rank for each of the plurality of videos.

2. The method of claim 1, wherein the concept rank associated with each of the plurality of concepts is a number.

3. The method of claim 2, wherein determining the video rank for each of the plurality of videos comprises summing the concept rank associated with each of the plurality of concepts in the subset.

4. The method of claim 1, further comprising:
    submitting a search request for the search of the database prior to receiving the search results.

5. The method of claim 4, wherein the search request comprises a keyword, and wherein the search of the database is a keyword search.

6. The method of claim 5, wherein the database is an encyclopedia, and wherein the search results are based on information in an encyclopedia article corresponding to the keyword and information in web pages which are linked to the encyclopedia article.

7. The method of claim 6, wherein the search of the database comprises an n-level depth recursive traversal of the web pages.

8. The method of claim 1, wherein identifying the plurality of videos comprises identifying a plurality of videos which have not been viewed by a user.

9. A non-transitory computer-readable medium having instructions stored thereon, the instructions comprising:
    instructions to receive search results from a search of a database, the search results comprising a plurality of concepts and a concept rank associated with each of the plurality of concepts;
    instructions to identify a plurality of videos, each of the plurality of videos having associated therewith at least one video tag;
    instructions to determine, for each of the plurality of videos, a subset of the plurality of concepts, wherein each of the plurality of concepts in the subset corresponds with one of the at least one video tag;
    instructions to determine, for each of the plurality of videos, a video rank based on the concept rank for each of the plurality of concepts in the subset; and
    instructions to provide a link to each of the plurality of videos and an indication of a rank of the plurality of videos, wherein the rank of the plurality of videos is based on the video rank for each of the plurality of videos.

10. The non-transitory computer-readable medium of claim 9, wherein the concept rank associated with each of the plurality of concepts is a number.

11. The non-transitory computer-readable medium of claim 10, wherein the instructions to determine the video rank for each of the plurality of videos comprise instructions to sum the concept rank associated with each of the plurality of concepts in the subset.

12. The non-transitory computer-readable medium of claim 9, the instructions further comprising:
instructions to submit a search request for the search of the database prior to receiving the search results.

13. The non-transitory computer-readable medium of claim 12, wherein the search request comprises a keyword, and wherein the search of the database is a keyword search.

14. The non-transitory computer-readable medium of claim 13, wherein the database is an encyclopedia, and wherein the search results are based on information in an encyclopedia article corresponding to the keyword and information in web pages which are linked to the encyclopedia article.

15. The non-transitory computer-readable medium of claim 14, wherein the search of the database comprises an n-level depth recursive traversal of the web pages.

16. The non-transitory computer-readable medium of claim 9, wherein the instructions to identify the plurality of videos comprise instructions to identify a plurality of videos which have not been viewed by a user.

17. A computing device, comprising:
a communication mechanism configured to communicate via a network;
at least one processor;
a concept extractor configured to:
receive, via the communication mechanism, search results from a search of a database, the search results comprising a plurality of concepts and a concept rank associated with each of the plurality of concepts,
identify a plurality of videos, each of the plurality of videos having associated therewith at least one video tag, and
determine, for each of the plurality of videos, a subset of the plurality of concepts, wherein each of the plurality of concepts in the subset corresponds with one of the at least one video tag; and
a ranker configured to determine, for each of the plurality of videos, a video rank based on the concept rank for each of the plurality of concepts in the subset;
wherein the computing device is configured to provide a link to each of the plurality of videos and an indication of a rank of the plurality of videos, wherein the rank of the plurality of videos is based on the video rank for each of the plurality of videos.

18. The computing device of claim 17, wherein the concept rank associated with each of the plurality of concepts is a number.

19. The computing device of claim 18, wherein the concept extractor is configured to determine the video rank for each of the plurality of videos by summing the concept rank associated with each of the plurality of concepts in the subset.

20. The computing device of claim 17, wherein the concept extractor is further configured to submit a search request for the search of the database prior to receiving the search results.

21. The computing device of claim 20, wherein the search request comprises a keyword, and wherein the search of the database is a keyword search.

22. The computing device of claim 21, wherein the database is an encyclopedia, and wherein the search results are based on information in an encyclopedia article corresponding to the keyword and information in web pages which are linked to the encyclopedia article.

23. The computing device of claim 22, wherein the search of the database comprises an n-level depth recursive traversal of the web pages.

24. The computing device of claim 17, wherein the concept extractor is configured to identify the plurality of videos by identifying a plurality of videos which have not been viewed by a user.

25. A system, comprising:
means for receiving search results from a search of a database, the search results comprising a plurality of concepts and a concept rank associated with each of the plurality of concepts;
means for identifying a plurality of videos, each of the plurality of videos having associated therewith at least one video tag;
means for determining, for each of the plurality of videos, a subset of the plurality of concepts, wherein each of the plurality of concepts in the subset corresponds with one of the at least one video tag;
means for determining, for each of the plurality of videos, a video rank based on the concept rank for each of the plurality of concepts in the subset; and
means for providing a link to each of the plurality of videos and an indication of a rank of the plurality of videos, wherein the rank of the plurality of videos is based on the video rank for each of the plurality of videos.

26. The system of claim 25, wherein the concept rank associated with each of the plurality of concepts is a number.

27. The system of claim 26, wherein the means for determining the video rank for each of the plurality of videos comprises means for summing the concept rank associated with each of the plurality of concepts in the subset.

28. The system of claim 25, further comprising:
means for submitting a search request for the search of the database prior to receiving the search results.

29. The system of claim 28, wherein the search request comprises a keyword, and wherein the search of the database is a keyword search.

30. The method of claim 29, wherein the database is an encyclopedia, and wherein the search results are based on information in an encyclopedia article corresponding to the keyword and information in web pages which are linked to the encyclopedia article.

31. The system of claim 30, wherein the search of the database comprises an n-level depth recursive traversal of the web pages.

32. The method of claim 25, wherein the means for identifying the plurality of videos comprises means for identifying a plurality of videos which have not been viewed by a user.

* * * * *

UNITED STATES PATENT AND TRADEMARK OFFICE
CERTIFICATE OF CORRECTION

PATENT NO. : 8,473,845 B2
APPLICATION NO. : 11/810807
DATED : June 25, 2013
INVENTOR(S) : Igelman et al.

It is certified that error appears in the above-identified patent and that said Letters Patent is hereby corrected as shown below:

In the Specification:

In Column 7, Line 43, delete "At step 310" and insert -- At step 320 --, therefor.

In Column 12, Line 1, delete "does no" and insert -- does not --, therefor.

In Column 13, Line 12, delete "websites 525," and insert -- websites 530, --, therefor.

In the Claims:

In Column 16, Line 48, in Claim 30, delete "method" and insert -- system --, therefor.

In Column 16, Line 56, in Claim 32, delete "method" and insert -- system --, therefor.

Signed and Sealed this
First Day of April, 2014

Michelle K. Lee
*Deputy Director of the United States Patent and Trademark Office*